United States Patent [19]
Humphries et al.

[11] Patent Number: 5,749,936
[45] Date of Patent: May 12, 1998

[54] METHOD OF PRODUCING DRY GRANULAR FERTILIZER AND SOIL AMENDMENTS USING CLAY SLURRY AND DRY CHEMICALS

[75] Inventors: Robert D. Humphries, Edgewood, Md.; Delbert R. Dreese, Etters, Pa.; Louis L. Taylor, West Friendship; Dennis Clay Parker, Sparks, both of Md.

[73] Assignee: A.J. Sackett and Sons Company, Baltimore, Md.

[21] Appl. No.: 657,591

[22] Filed: Jun. 7, 1996

[51] Int. Cl.⁶ ........................................ A01N 25/00
[52] U.S. Cl. ...................... 71/64.05; 71/64.13; 71/904
[58] Field of Search .................... 71/64.03, 903, 71/904, 64.05, 64.13

[56] References Cited

U.S. PATENT DOCUMENTS

| T940,014 | 11/1975 | Nichols et al. | 71/29 |
|---|---|---|---|
| 2,498,480 | 2/1950 | Bierlich et al. | 71/23 |
| 3,041,159 | 6/1962 | Smith | 71/64 |
| 3,062,637 | 11/1962 | Marples et al. | 71/2.4 |
| 3,509,066 | 4/1970 | Jacobs et al. | 252/313 |
| 4,318,732 | 3/1982 | Sawyer, Jr. | 71/64.3 |
| 4,617,048 | 10/1986 | Salladay et al. | 71/30 |
| 4,954,155 | 9/1990 | Elrod et al. | 71/28 |
| 5,439,497 | 8/1995 | Boles | 71/63 |

*Primary Examiner*—Ferris Lander
*Attorney, Agent, or Firm*—Leonard Bloom

[57] ABSTRACT

An improved continuous process for producing granular fertilizer and/or soil amendments resulting in a high quality granular product. A slurry of clay in water with a dispersant is prepared using intensive mixing. Dry components are intimately mixed with the slurry in a mixer. The mixture is fed into a granulator to produce granules within a desired range of granule sizes. The granules are dried in a dryer and screened to remove any granules of an undesired size. The undesired granules are recycled.

14 Claims, 2 Drawing Sheets

5,749,936

METHOD OF PRODUCING DRY GRANULAR FERTILIZER AND SOIL AMENDMENTS USING CLAY SLURRY AND DRY CHEMICALS

BACKGROUND OF THE INVENTION

The present invention provides a method for producing a granular fertilizer and/or soil amendments and, more particularly, a method which mixes an aqueous slurry of clay with dry minerals and chemicals.

The agriculture industry and other industries use fertilizer and other materials in a granular form for ease of dissemination and storage. It is desired that the granules be of a controlled size and not be frangible so that the product can be spread at a desired weight per unit area and that the product dissolve at a desired rate. Large amounts of fine product due to rupture of the granules or large amounts of agglomerated particles are detrimental to the effectiveness of the product. Most presently available granular multi-nutrient fertilizers are produced with technology which uses a chemical reaction to produce heat which promotes granulation from a liquid phase to a solid state. Normally acids (sulfuric, nitric and/or phosphoric acid) and ammonia (anhydrous) are used to produce these fertilizers. The use of these chemicals creates a potentially hazardous environment for production of the fertilizer. In developing countries, these chemicals may be less available with the consequence that fertilizer must be imported at considerable expense and crop yields are reduced in areas where food is most needed.

Some multi-nutrient fertilizers are produced using all dry materials and steam to form the particles. Also, producing granules by compacting techniques have been used. However, these methods have not been very successful, due to the generally poor quality of the resulting granules.

The use of clay in fertilizer has been reported. U.S. Pat. No. 2,498,480 to Bierlich discloses a fertilizer having a cellulosic carrier mixed with dry, finely divided bentonite clay. U.S. Pat. No. 3,041,159 to Smith discloses calcined, dry attapulgite clay with dry ammonium nitrate. U.S. Pat. No. 3,062,637 to Marples discloses herbicidal granules made from dry clay and colloidal clay have 10% clay content. The granules are prepared by extruding and cutting into pellets. Salladay, in U.S. Pat. No. 4,617,048 discloses a process for producing urea ammonium nitrate by the addition of dry bentonite clay to a hot solution of urea without dispersants and subsequently adding hot ammonium nitrate solution. Elrod et al. U.S. Pat. No. 4,954,155 disclose sonic energy to disperse clay in fertilizer solutions. In U.S. Pat. No. 5,439,497, Boles recognizes the need for non-caking, free flowing fine particles of ammonium sulfate and discloses the batch mixture of dry attapulgite clay with ammonium sulfate in equipment for mixing solids.

Dispersions of attapulgite clay using tetrasodium pyrophosphate is disclosed by Jacobs et al in U.S. Pat. No. 3,509,066. Sawyer, Jr. in U.S. Pat. No. 4,318,732 discloses the addition of ground, unslaked lime to ground colloidal clay. U.S. Pat. No. T 940,014 to Nichols discloses dispersing attapulgite clay with dispersing agent and adding the dispersion to a solution of fertilizer to be used in the liquid form.

In summary, the prior art has used a clay dispersion or slurry with fertilizers but never in connection with a mixing and granulation process to produce the desired granules (and in an environmentally-friendly process); and while mixing and granulating, per se, are old in the art, no one has to date used that known process with a clay slurry.

There exists a need to produce granules of material, such as fertilizer, which have reduced environmental hazards during production, can be formed to a desired size and resist rupture and agglomeration during storage.

BRIEF SUMMARY OF THE INVENTION

It is an object of the present invention to continuously produce homogeneous dry granular material, such as fertilizer, which is produced in a desired size and which retain the granular size in storage.

It is a further object of the present invention to produce granules of material by mixing an aqueous slurry of clay with dry substances to obtain granules of a desired size.

It is yet another object of the present invention to produce granules without the use of hazardous materials such as acid.

It is still another object of the present invention to provide an efficient process which requires minimal recycling of particles which are not in the desired range of granule size.

In accordance with the teachings of the present invention, there is disclosed the environmentally friendly method of continuously producing high quality homogeneous dry granular fertilizer and/or soil amendments. The method includes the steps of producing an aqueous slurry including a clay and a dispersant and intimately mixing the slurry with minerals and chemicals for use in agriculture. The mixture is tumbled in a granulator to agglomerate and form granules having a desired range of granule sizes. The granules are dried and screened thereby producing the desired granular fertilizer and/or soil amendments economically and at a relatively high production rate with a minimum of recycling and avoiding the storage of hazardous materials.

Viewed in another aspect, the present invention discloses the method of producing homogeneous dry granular fertilizer and/or soil amendments which includes the steps of adding a dispersant to water, adding clay to the dispersant water solution, and mixing to produce a slurry. The slurry is added to dry minerals and chemicals for use in agriculture. The dry minerals and chemicals are in the form of a plurality of individual particles. The slurry and dry material is intimately mixed to coat the dry minerals and chemical particles with the slurry of clay. The mixture is fed into a granulator and tumbled in the granulator for a desired period of time to agglomerate the mix and form granules of a desired range of granule sizes. The granules are fed into a drier at a selected temperature for a desired time. The granules are screened to reject undesired, fine granules and large granules, and the undesired fine granules and large granules are recycled.

Attapulgite and sepiolite clay are used.

These and other objects of the present invention will become apparent from a reading of the following specification taken in conjunction with the enclosed drawings.

DESCRIPTION

Figure 1:
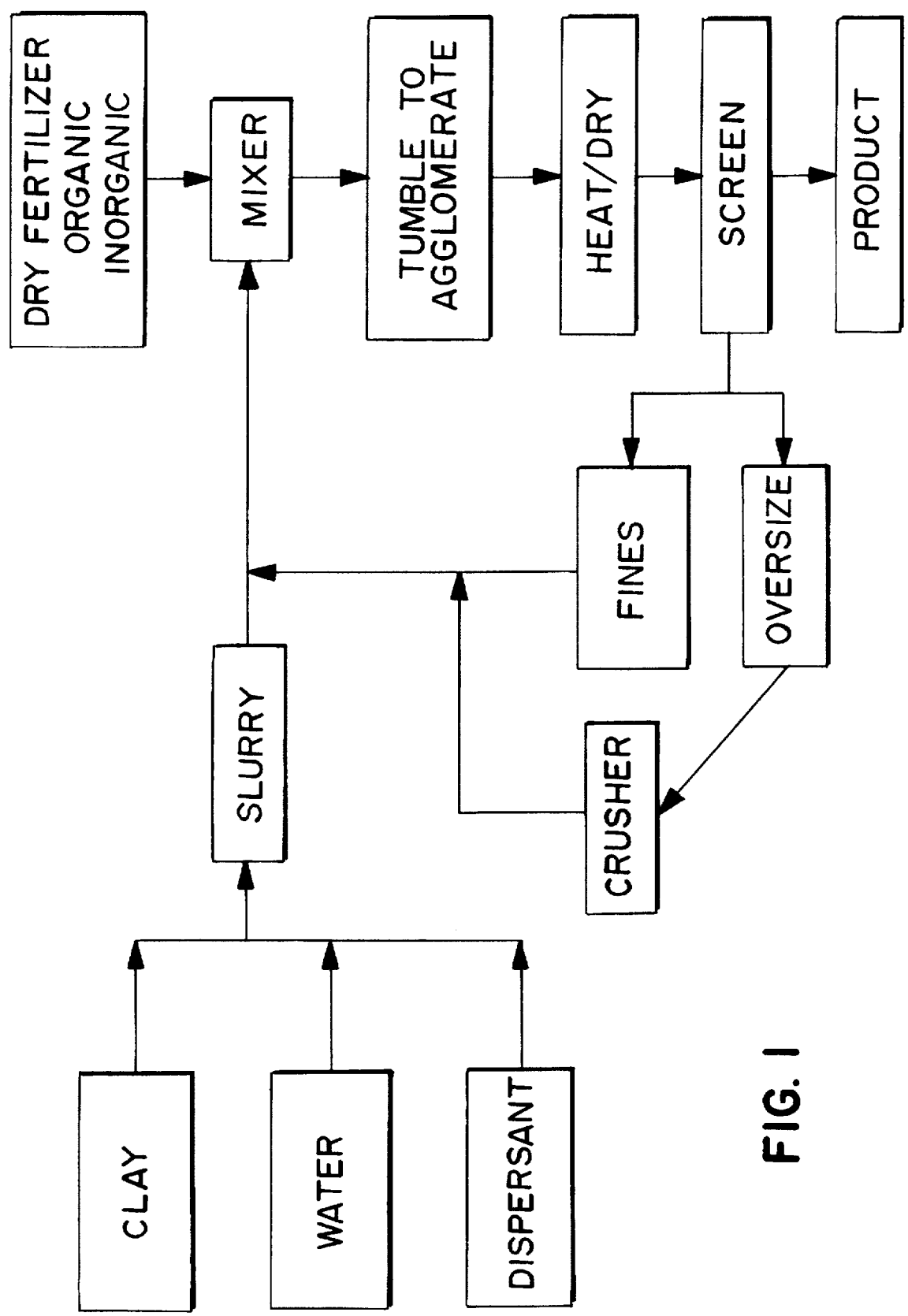
FIG. 1 is a schematic block diagram showing the steps of the method of the present invention.

Referring to FIG. 1, clay such as palygorskite (also known as attapulgite) and sepiolite which do not shrink on heating and drying, is added to water which contains a dispersant such as tetra sodium pyrophosphate, sodium polyacrylate, sodium hexametaphosphate or sodium silicate. Preferably, the clay is approximately 12–35% by weight of the water and the dispersant is approximately 2–3% by weight of clay (0.2 to 1% by weight of the clay plus water). It is desirable to have the maximum amount of clay possible to reduce the amount of water which will subsequently need to be removed. The clay, water, and dispersant are mixed thoroughly and intensively to produce a slurry. The slurry is stable for several days.

The dry minerals, chemicals and soil amendments, which constitute the fertilizer or other material to be granulated, are in the form of powder, crystals or a plurality of separate individual particles. Small additions of chemicals in liquid form can also be implemented. Soil amendments are additives to soil which alter the physical or chemical properties of the soil. Examples of these are limestone, dolomite, gypsum and clay but are not limited to these materials. The slurry of clay and the dry minerals and dry or wet chemicals are mixed together in a mixer. Preferably the slurry and dry material are simultaneously fed into the mixer, but, alternately, the slurry can be added to the dry materials. Preferably, the slurry addition results in approximately 1–5% of the weight of clay in the final mix of clay plus dry materials. The mixer is a device capable of imparting shear to the dry material and the slurry. The mixing continues until the separate particles of dry material are coated with clay and granules begin to form. The residence time in the mixer is variable depending upon the amount of clay and the amount and type of dry material, the chemical nature of the dry material and rate of mixing.

The mixture from the mixing device is fed into a granulator which rotates and the contents tumble within the granulator. During this step, the smaller granules agglomerate to form granules of a desired range of sizes. The size of the granules is controlled by the residence time within the granulator and is also a function of the relative amount of clay and the chemical nature of the dry material. The particle size desired is a function of the use to be made of the product and also, where the product will be used. For example, fertilizer used in the U.S. preferably has a smaller granular size than fertilizer used in Europe. The granules produced by the present method may be shapes other than spherical.

The granulated product is fed into a dryer to remove excess water and to harden the granules. Preferably, the dryer is a rotatable drum which is mounted angularly. Lifters (or plates) are disposed within the dryer and the contents fall from upper plates to lower plates as the dryer rotates. The dryer is heated to accelerate removal of the water. The granules within the dryer harden and particle size remains unaffected.

The granular product from the dryer is passed over a screen where fine particles smaller than the desired size are removed and granules larger than the desired size are separated. These undesired granules are recycled to provide a more efficient process.

The final granular product having the desired granular size is available for storage or packaging and shipment.

Figure 2:
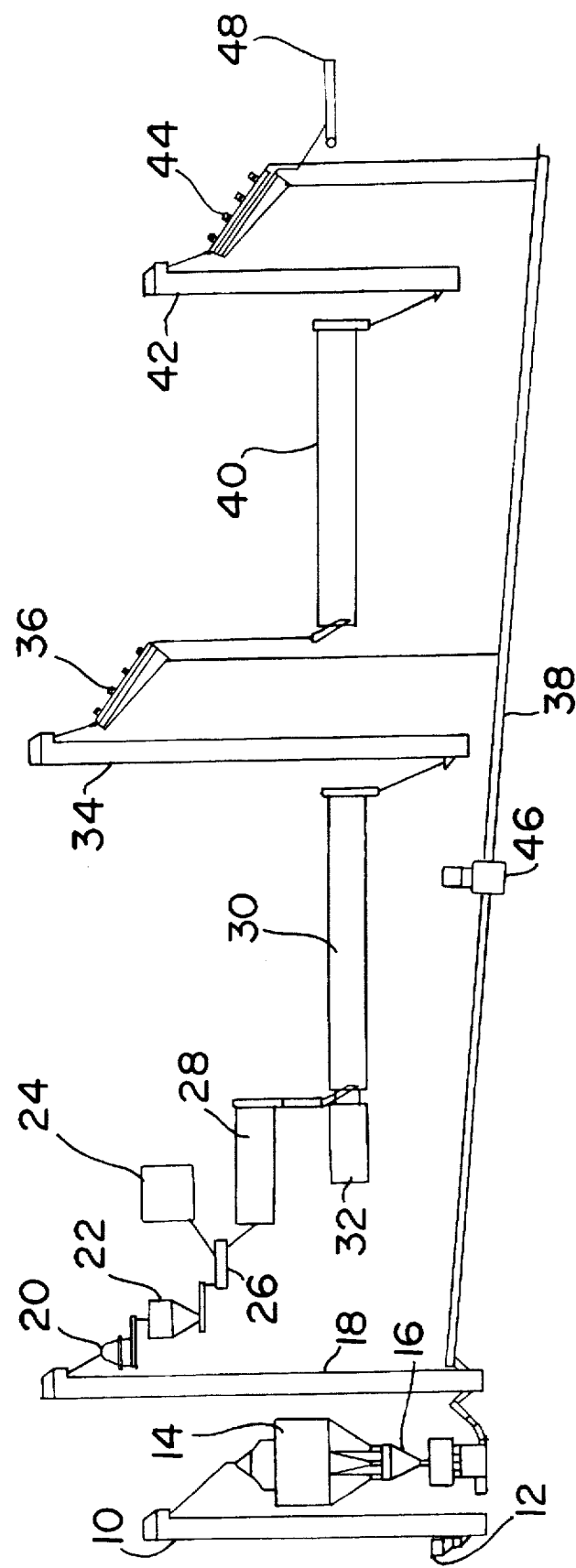
FIG. 2 is a diagrammatic view of the continuous process of the present invention.

Referring to FIG. 2, the dry minerals and chemicals are introduced into a first elevator 10 after having any large clumps broken up in crusher 12. The dry material is fed into a hopper 14 and into a weigh hopper 16 which loads to a predetermined weight. The weighed amount of dry material is introduced to a second elevator 18 and fed into a mill 20 to grind the dry material to a selected maximum particle size. The plurality of individual particles of dry material are introduced into a surge bin 22 having means such as a screw feed to continuously feed the dry material.

A solution of dispersant in water is prepared and the clay is added to it with intensive mixing to form a slurry 24. The slurry of clay is mixed with the dry material in a mixer 26. A small amount of a liquid additive could also be introduced. The mix is fed into a granulator 28. The granules are fed into a dryer 30 which is heated to the desired temperature by a heater 32. The heater may be a furnace.

The dried granules are passed into a third elevator 34 and led onto a first screen 36. The screen separates the granules which are smaller than desired (fines) and the granules which are larger than desired from those granules within the desired size range. The undesired range of granules are returned for recycling 38.

In some operations, the granules are at an elevated temperature and it is advantageous to pass the product through a cooler. Accordingly, for improved quality control, the product is introduced to a fourth elevator and passed over a second screen 44 to select the granules having the desired range of granules sizes. The undesired granules are recycled 38, including an oversize crusher 46 to reduce the size of the large granules. Although the method described above and shown in FIG. 2 discloses elevators, these are not essential and alternate means of continuous processing of the material may be used.

The final homogeneous product having the desired size range of granules is fed from the outlet 48 for bulk storage or packaging in bags. The granules of the final product of the present invention resist agglomeration and clumping during storage and transportation due to the composition and structure of the granules.

The method as described herein is a continuous process which is controllable such that up to 90% of the product falls within the desired granular size range on the initial pass through the system. The oversize and undersize granules are recycled. The least efficient prior art processes, including batch methods, have only approximately 30% of the product in the desired range. Thus, the method of the present invention is much more economical not only in reducing the unit cost of the product, but also in savings of energy, maintenance costs and manpower. Furthermore, additional savings are obtained because there are no unusual safety precautions needed such as in the prior art which employs acids and ammonia.

The present method can be used with single nutrient and multinutrient types of fertilizers as well as with soil amendments. All that is required is for most of the material to be in a dry form with a plurality of separate individual particles such as a powder or crystals which can be mixed with the clay slurry. The fertilizer may be inorganic, organic, mixtures or combinations thereof.

Obviously, many modifications may be made without departing from the basic spirit of the present invention. Accordingly, it will be appreciated by those skilled in the art that within the scope of the appended claims, the invention may be practiced other than has been specifically described herein.

We claim:

1. The environmentally friendly method of continuously producing a high quality homogeneous dry granular fertilizer and/or soil additive selected from the group consisting of limestone, dolomite and gypsum, comprising the steps of:

producing an aqueous slurry including a clay and a dispersant, the clay being selected from the group consisting of palygorskite, attapulgite and sepiolite, intimately mixing the slurry with the fertilizer and/or the soil additive, thereby producing a mixture, wherein the slurry addition results in approximately 1–5% by weight of clay in the final mixture of fertilizer and/or soil additive, tumbling the mixture in a granulator to agglomerate and form granules having a desired range of granule sizes, and drying and screening the granules, thereby producing the desired granular fertilizer and/or soil additive economically and at a relatively high production rate with a minimum of recycling and avoiding the storage of hazardous materials.

2. The method of claim 1, wherein most of the minerals and chemicals are dry.

3. The method of claim 1, wherein the dispersant is selected from the group consisting of tetrasodium pyrophosphate, sodium polyacrylate, sodium hexametaphosphate and sodium silicate.

4. The method of claim 1, wherein the slurry contains approximately 12–35% by weight of clay.

5. The method of claim 4, wherein the slurry contains at least 25% by weight of clay.

6. The method of claim 1, further comprising adjusting the residence time of the mixture in the granulator to control the size of the granules.

7. The method of claim 1, wherein up to 90% of the granules are produced within the desired particle size range on a first pass, such that recycling is reduced.

8. The method of claim 1, wherein the mixing is performed in a high shear, intense mixer.

9. The method of claim 1, wherein the dry fertilizer and/or soil additives are in the form of a plurality of individual particles and the intimate mixing coats said particles with the clay slurry.

10. The method of claim 1, wherein the fertilizers are single nutrient materials.

11. The method of claim 1, wherein the fertilizers are multi-nutrient materials.

12. The method of producing a homogeneous dry granular fertilizer and/or soil additive selected from the group consisting of limestone, dolomite and gypsum comprising the steps of:

adding a dispersant to water, adding clay to the dispersant-water solution, and mixing to produce a slurry, the clay being selected from the group consisting of palygorskite, attapulgite and sepiolite, mixing the slurry with dry fertilizer and/or soil additive for use in agriculture, wherein the slurry addition results in approximately 1–5% by weight of clay in the final mixture of fertilizer and/or soil additive, the dry fertilizer and/or soil additive being in the form of a plurality of individual particles, mixing intimately to coat the dry minerals and chemical particles with the slurry of clay, feeding the mix into a granulator for a desired period of time to agglomerate the mix and form granules of a desired range of granule sizes, feeding the granules into a dryer at a selected temperature, for a desired time, and screening the granules to reject undesired, fine granules and large granules, and recycling the undesired fine granules and large granules.

13. The method of claim 12, further comprising cooling the granules before and after screening.

14. The method of producing a homogeneous dry granular fertilizer comprising the steps of:

providing an aqueous solution of a dispersant, adding a quantity of clay to the aqueous dispersant and mixing to produce a slurry having at least 12% by weight of clay, the clay being selected from the group consisting of palygorskite, attapulgite and sepiolite, intimately mixing the slurry with dry, particulate fertilizer, wherein the dry particles are coated with the slurry, tumbling the coated particles to agglomerate the particles into granules, drying the granules and screening the granules.

* * * * *